US006801158B2

(12) United States Patent
Snodgrass et al.

(10) Patent No.: US 6,801,158 B2
(45) Date of Patent: Oct. 5, 2004

(54) ANNUNCIATION OF THE DISTANCE TO A TARGET POSITION IN A GLOBAL POSITIONING SYSTEM LANDING SYSTEM

(75) Inventors: Ken L. Snodgrass, Peoria, AZ (US); John A. Howell, III, New River, AZ (US); Robert S. Doyle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/251,454

(22) Filed: Sep. 19, 2002

(65) Prior Publication Data

US 2003/0052816 A1 Mar. 20, 2003

Related U.S. Application Data

(60) Provisional application No. 60/324,035, filed on Sep. 20, 2001.

(51) Int. Cl.$^7$ ................................................ G01S 5/14
(52) U.S. Cl. .............................. 342/357.08; 342/357.09
(58) Field of Search ....................... 342/357.08, 357.03, 342/357.09; 340/947, 951, 972, 980, 435, 686.6

(56) References Cited

U.S. PATENT DOCUMENTS

| 4,866,450 | A | * | 9/1989 | Chisholm | 342/410 |
|---|---|---|---|---|---|
| 4,979,154 | A | | 12/1990 | Brodeur | |
| 5,361,212 | A | * | 11/1994 | Class et al. | 701/16 |
| 5,657,009 | A | * | 8/1997 | Gordon | 340/968 |
| 5,702,070 | A | * | 12/1997 | Waid | 244/183 |
| 5,786,773 | A | * | 7/1998 | Murphy | 340/947 |
| 6,239,745 | B1 | * | 5/2001 | Stratton | 342/410 |
| 6,477,449 | B1 | * | 11/2002 | Conner et al. | 701/4 |

OTHER PUBLICATIONS

Swider, Raymond et al, "Recent Developments in the LAAS Program," Ronald Braff The MITRE Corporation, IEEE 1998, pp. 442–470.*
Misara, P et al "Augmentation of GPS/LAAS with GLO-NASS: Performance Assessment," ION–GPS–98, 7 pages.*
Satellite Operational Implementation Team (SOIT);"Local Area Augmentation System: LAAS Concept of Operations, Nov. 17, 1999;" 'Online!', Nov. 17, 1999, Section 2.2 "Flight Instrument Presentation," p. 7–8, Section 3.6.2 "Tuning/Anunciation," p. 10–11, Appendix 3 "Fixed Wing Aircraft Presentation," p. 29–30.
Pederson, B.A. et al; "Collins GLS Architecture for Regional and Business Aircraft;" Digital Avionics Systems Conference, 1997; AIAA/IEEE Irvine, CA, USA, Oct. 26–30, 1997, pp. 61–16–61–22; Section, "System Arcjtecture," p. 6.1–17–6.1–18, figure 2; Section, "Other Approach Operations," p. 6.1–21; figure 3.

* cited by examiner

Primary Examiner—Gregory C. Issing

(57) ABSTRACT

A system for providing distance information to the pilot of an aircraft utilizing a GPS Landing System (GLS) Local Area Augmentation System (LAAS) as a navigation and landing aid for the aircraft is provided, which includes a radio receiver adapted to receive signals from a ground-based radio transmitter associated with the LAAS, the signals including signals representing the location of the LAAS. A Global Positioning System (GPS) receiver adapted to receive position signals from GPS satellites and for producing signal representing the location of the aircraft is also provided, as is a controller coupled to the radio receiver and to the GPS receiver for receiving the signals representing the locations of the LAAS and of the aircraft, respectively, and for calculating the distance of the aircraft from the LAAS. A signaling mechanism coupled to the controller provides to the pilot of the aircraft with information representing the distance of the aircraft to the end of the runway.

10 Claims, 1 Drawing Sheet

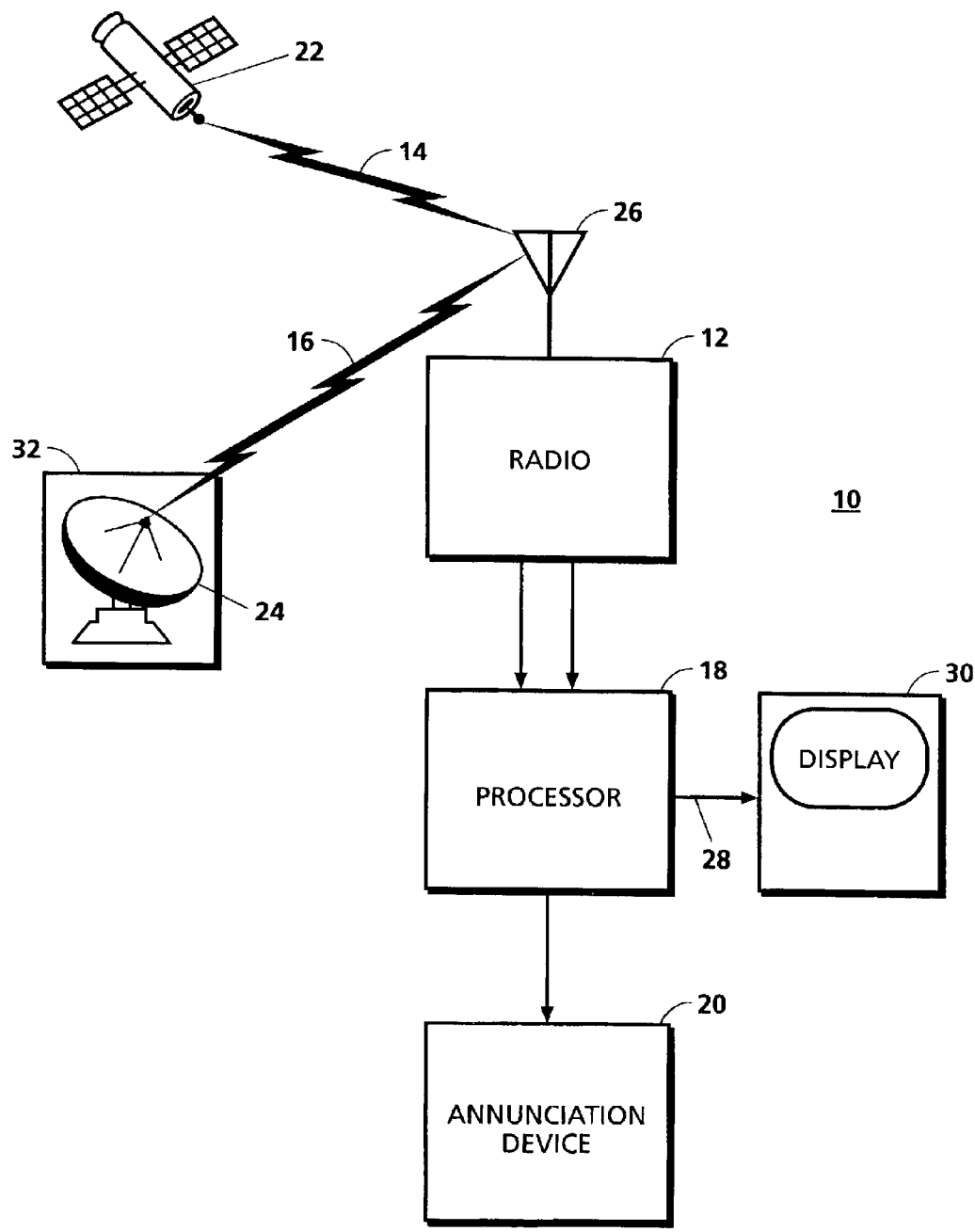

ANNUNCIATION OF THE DISTANCE TO A TARGET POSITION IN A GLOBAL POSITIONING SYSTEM LANDING SYSTEM

CROSS REFERENCE TO RELATED APPLICATIONS

This application claims the benefit of U.S. Provisional Patent Application No. 60/324,035, filed Sep. 20, 2001.

TECHNICAL FIELD

The present invention relates to an aircraft navigational and landing system, and more particularly to a Local Area Augmentation System.

BACKGROUND OF THE INVENTION

A Local Area Augmentation System (LAAS) is Global Positioning System (GPS) Landing System (GLS) used at some airports as a primary or auxiliary landing system for certain runways. The system comprises a ground-based radio receiver that receives signals from a plurality of satellites of the Global Positioning System. The GLS also has available a transmitter that is used to communicate certain navigation and landing information to aircraft wishing to avail themselves of the GLS as an aid to landing on the runway to which the GLS is dedicated.

It is possible that one or more of the satellites of the Global Positioning System may fail. In addition, the GPS is operated under the control of the U.S. Government, which can modify the accuracy of the GPS in the event of, for example, the use of the GPS by enemy aircraft or missiles. Thus the ground-based GPS receiver continually monitors the satellites for failure or inaccuracy and relates that information as well as navigation and landing information to the aircraft.

Since the GPS receiver of the LAAS system is in a fixed and known position, the actual position of the receiver antenna is continually compared to the information being received by the LAAS GPS receiver. Any disparity between the actual position of the receiving antenna and the information provided by the GPS satellites is included in an error correction factor which is transmitted to any aircraft using the LAAS GLS. Also, since the position of the end of the runway which the GLS is serving is also fixed and known, any error factors would also be applicable to the signals identifying the approach end of the runway to the aircraft.

In addition to the navigation and landing information carried on the digital uplink from the ground-based transmitter, LAAS systems additionally transmit to the aircraft identification signals providing ground station frequency and runway identification information that the pilot (or crewmember) of the aircraft can use to confirm that the transmission being received is for the runway and airport at which it is desired to land.

Presently, GLS systems do not provide the pilot of an aircraft utilizing the system with an indication of distance to the end of the runway. ILS systems, in addition to a glide slope signal, provide marker beacons that signal to the pilot certain distances or positions with respect to the end of the runway which the aircraft is approaching. Typically, three beacons are provided, an outer marker, a middle marker, and an inner marker. Each of the beacons is identified by a visual indicator (typically a light of the instrument panel) and an aural indicator (typically a Morse code identifier of the identity of the beacon). Consequently, it would be useful to provide to the users of a GLS system a similar signaling mechanism that would alert the aircraft pilot of the position of the aircraft with respect to the approach end of the runway.

BRIEF SUMMARY OF THE INVENTION

A system for providing distance information to the pilot of an aircraft utilizing a GPS Landing System (GLS) Local Area Augmentation System (LAAS) as a navigation and landing aid for the aircraft is provided, which includes a radio receiver adapted to receive signals from a ground-based radio transmitter associated with the LAAS, the signals including signals representing the location of the LAAS. A Global Positioning System (GPS) receiver adapted to receive position signals from GPS satellites and for producing signal representing the location of the aircraft is also provided, as is a controller coupled to the radio receiver and to the GPS receiver for receiving the signals representing the locations of the LAAS and of the aircraft, respectively, and for calculating the distance of the aircraft from the LAAS. A signaling mechanism coupled to the controller provides to the pilot of the aircraft with information representing the distance of the aircraft to the end of the runway.

BRIEF DESCRIPTION OF THE DRAWINGS

The present invention will hereinafter be described in conjunction with the appended drawing figure, where:

The FIGURE shows a block diagram of an aircraft radio and its associated controller in accordance with the instant invention.

DETAILED DESCRIPTION OF PREFERRED EXEMPLARY EMBODIMENTS

The following detailed description of a preferred embodiment is merely exemplary in nature and is not intended to limit the invention or the application and uses of the invention.

Referring to the FIGURE, a system 10 for annunciating the distance to a desired position, which may be, for example, the distance to the end of the runway, in a Global Positioning System (GPS) Landing System (GLS) is illustrated in accordance with a preferred exemplary embodiment of the present invention. In this illustrative and preferred exemplary embodiment, the system 10 is a system for annunciating the distance of an aircraft to a location on an aircraft runway, such the approach end of an aircraft runway. The system 10 comprises a radio 12 configured to receive a GPS position signal 14 from GPS satellites, and a signal 16 from a ground-based LAAS system comprising identification and runway information and any error correction factors which may be applicable to the GPS signals being received by the LAAS ground station from the GPS satellites, a processor 18 configured to calculate the distance to the end of the aircraft runway, and an annunciation device 20 configured to annunciate the distance calculated by the processor.

More specifically, the radio is configured to receive the GPS position signal 14 from a GPS system 22 via a wireless link and with an antenna 26 or any number of reception devices, from which the position of the aircraft (Position$_{aircraft}$) can be determined according to techniques well known in the art. The radio 12 of the system 10 is also configured to receive a station identification signal, runway information and any error correction factors which may be applicable to the GPS signals being received by the LAAS ground station from the GPS satellites from the LAAS 32 via a wireless link and an antenna 24 or any number of reception devices, from which the position of the approach end of the runway (Position$_{runway}$) is obtained according to techniques well known in the art. The position of the aircraft (Position$_{aircraft}$) and the position of the runway (Position$_{runway}$) are provided to the processor 18 for subsequent processing. The processor 18 can be a separate component of the system 10 or an integrated component of the radio or other system of the aircraft.

Once the processor 18 receives the position of the aircraft (Position$_{aircraft}$) and the position of the runway (Position$_{runway}$), the difference between the position of the aircraft (Position$_{aircraft}$) and the position of the runway (Position$_{runway}$) is calculated and the result is the distance to the approach end of the runway from the aircraft (i.e., Distance$_{end-of-runway}$=Position$_{aircraft}$−Position$_{runway}$ or Distance$_{end-of-runway}$=Position$_{runway}$−Position$_{aircraft}$). The processor evaluates the distance to the end of the runway from the aircraft (Distance$_{end-of-runway}$) and generates a distance signal corresponding to the distance to the end of the runway from the aircraft (Distance$_{end-of-runway}$), which is provided to the annunciation device for generation of a predefined audible corresponding to the distance to the end of the runway from the aircraft (Distance$_{end-of-runway}$).

As can be appreciated by one of ordinary skill in the art, the processor 18 can be configured to generate the distance signal in any number of formats that can be used by the annunciation device 20 to develop the predefined audible or that can actually drive the annunciation device 20. The annunciation device 20 can be any number of devices configured to convert the distance signal into one or more sound waves, which are radiated into the surrounding environment, such as by loudspeaker. In accordance with a preferred embodiment of the present invention, the annunciation device 20 is configured to generate a vocal or musical sound (i.e., a tone) for the predefined audible. For example, the annunciation device 20 can be configured to generate a different tone that corresponds to "one mile", "two miles," three miles," etc., or the annunciation device 20 can be configured to synthesize a voice that pronounces each of the distances (i.e., synthesizes speech of "one mile," two miles," three miles," etc.) As can be appreciated by one of ordinary skill in the art, the system 10 provides an audible tone associated with the distance to a location of interest (i.e., end of a runway) that can be heard by the operator. As previously noted, in Instrument Landing Systems (ILSs) each of the three marker beacons emits a distinctive tone so that a pilot or crewmember can identify the marker solely by aural means.

In accordance with another embodiment of the system 10, a display 30 is provided and configured to receive the distance signal and generate a visual representation of the distances. For example, the display 30 can be configured to generate a numerical representation of the distance or an alpha-numeric such as "1 mile," "2 miles," "3 miles," etc. As can be appreciated by one of ordinary skill in the art, the visual representation of the distance generated by the display 30 can be individually utilized by the operator to recognize the distance to a location of interest or used in combination with the audible generated by the annunciation device 20.

From the foregoing detailed description of preferred exemplary embodiments, it should be appreciated that apparatus and methods are provided for confirming in the cockpit of an aircraft the identification of a LAAS ground station radio transmitter While preferred exemplary embodiments have been presented in the foregoing detailed description of preferred exemplary embodiments, it should be appreciated that other variations may exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. A system for providing distance information to the pilot of an aircraft utilizing a Local Area Augmentation System (LAAS) as a navigation and landing aid for the aircraft, comprising:

a radio receiver adapted to receive signals from a ground-based radio transmitter associated with the LAAS, the signals including signals representing the location of the LAAS and the end of a runway served by the LAAS;

a Global Positioning System (GPS) receiver adapted to receive position signals from GPS satellites and for producing signal representing the location of the aircraft;

a controller coupled to the radio receiver and to the GPS receiver for receiving the signals representing the locations of the end of the runway and of the aircraft, respectively, and for calculating the distance of the aircraft from the end of the runway; and a signaling mechanism coupled to the controller for providing to the pilot of the aircraft the distance of the aircraft to the end of the runway.

2. A system as set forth in claim 1 wherein the signaling mechanism produces a visual display.

3. A system as set forth in claim 2 wherein the visual display indicates the distance of the aircraft from the end of the runway.

4. A system as set forth in claim 1 wherein the signaling mechanism produces an aural signal.

5. A system as set forth in claim 4 wherein the aural signal indicates the distance of the aircraft from the end of the runway.

6. A system as set forth in claim 2 wherein the controller calculates the difference between the position of the aircraft and the end of the runway.

7. A system as set forth in claim 4 wherein the controller calculates the difference between the position of the aircraft and the end of the runway.

8. A system for providing distance information to the pilot of an aircraft utilizing a Local Area Augmentation System (LAAS) as a navigation and landing aid for the aircraft, comprising a radio receiver adapted to receive signals from a ground-based radio transmitter associated with the LAAS, the signals including signals representing the location of the end of the runway with which the LAAS is associated, a Global Positioning System (GPS) receiver adapted to receive position signals from GPS satellites and for producing signal representing the location of the aircraft, a controller coupled to the radio receiver and to the GPS receiver for receiving the signals representing the locations of the end of the runway and of the aircraft, respectively, the method comprising:

utilizing the signals representing the locations of the aircraft and of the LAAS to calculate the distance of the aircraft from the end of the runway; and providing to the pilot of the aircraft the distance of the aircraft to the end of the runway.

9. The method as set forth in claim 8 wherein the distance of the aircraft to the end of the runway is provided by a visual display.

10. The method as set forth in claim 8 wherein the distance of the aircraft to the end of the runway is provided by an aural signal.

\* \* \* \* \*